United States Patent
Ando et al.

(10) Patent No.: US 12,436,159 B2
(45) Date of Patent: Oct. 7, 2025

(54) AUTOMATIC ANALYSIS DEVICE

(71) Applicant: HITACHI HIGH-TECH CORPORATION, Tokyo (JP)

(72) Inventors: Takahiro Ando, Tokyo (JP); Sakuichiro Adachi, Tokyo (JP); Yasuhiro Keta, Tokyo (JP); Yuya Matsuoka, Tokyo (JP); Hiromitsu Mori, Tokyo (JP); Shin Imamura, Tokyo (JP); Eiichiro Takada, Tokyo (JP); Makoto Arai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 782 days.

(21) Appl. No.: 17/775,701

(22) PCT Filed: Oct. 7, 2020

(86) PCT No.: PCT/JP2020/038063
§ 371 (c)(1),
(2) Date: May 10, 2022

(87) PCT Pub. No.: WO2021/100349
PCT Pub. Date: May 27, 2021

(65) Prior Publication Data
US 2022/0397581 A1 Dec. 15, 2022

(30) Foreign Application Priority Data
Nov. 20, 2019 (JP) .................................. 2019-209249

(51) Int. Cl.
*B01L 3/00* (2006.01)
*B01D 15/08* (2006.01)
(Continued)

(52) U.S. Cl.
CPC ....... *G01N 35/00584* (2013.01); *G01N 21/33* (2013.01); *H05B 45/10* (2020.01)

(58) Field of Classification Search
CPC ............. G01N 35/00584; G01N 21/33; G01N 2201/06153; G01N 2201/0627;
(Continued)

(56) References Cited

U.S. PATENT DOCUMENTS

2006/0202133 A1  9/2006  Ok et al.
2008/0044912 A1  2/2008  Yamamoto et al.
(Continued)

FOREIGN PATENT DOCUMENTS

CN  1815196 A  8/2006
EP  1890142 A2  2/2008
(Continued)

OTHER PUBLICATIONS

Extended European Search Report issued on Oct. 20, 2023 for European Patent Application No. 20888755.4.
(Continued)

*Primary Examiner* — Jennifer Wecker
*Assistant Examiner* — Oyeleye Alexander Alabi
(74) *Attorney, Agent, or Firm* — Volpe Koenig

(57) ABSTRACT

Provided is an automatic analysis device capable of obtaining a stable light intensity over a wide wavelength band by multiplexing a plurality of LED lights and adjusting the temperature characteristics of each LED element. The automatic analysis device according to the present disclosure is configured such that light emitted from a second LED is reflected to be multiplexed on the same optical axis as the light emitted from a first LED, and the first LED and the second LED are in contact with the same temperature adjustment member.

9 Claims, 11 Drawing Sheets

(51) Int. Cl.

| | |
|---|---|
| *B01F 33/302* | (2022.01) |
| *B01F 33/3033* | (2022.01) |
| *B01L 7/00* | (2006.01) |
| *B01L 9/00* | (2006.01) |
| *B65G 47/80* | (2006.01) |
| *B82Y 20/00* | (2011.01) |
| *B82Y 30/00* | (2011.01) |
| *B82Y 40/00* | (2011.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/33* | (2006.01) |
| *G01N 21/65* | (2006.01) |
| *G01N 30/02* | (2006.01) |
| *G01N 30/72* | (2006.01) |
| *G01N 33/543* | (2006.01) |
| *G01N 33/557* | (2006.01) |
| *G01N 33/574* | (2006.01) |
| *G01N 33/58* | (2006.01) |
| *G01N 35/00* | (2006.01) |
| *H05B 45/10* | (2020.01) |

(58) Field of Classification Search
CPC ......... G01N 21/255; G01N 2021/3155; G01N 2021/3181; G01N 21/3151; H05B 45/10; H01L 25/0753
See application file for complete search history.

(56) References Cited

U.S. PATENT DOCUMENTS

| | | | |
|---|---|---|---|
| 2009/0009760 | A1 | 1/2009 | Kanayama et al. |
| 2009/0201577 | A1 | 8/2009 | Laplante et al. |
| 2010/0290952 | A1 | 11/2010 | Koike et al. |
| 2012/0085929 | A1 | 4/2012 | Westphal et al. |
| 2013/0188383 | A1 | 7/2013 | Jaffe et al. |
| 2014/0231680 | A1* | 8/2014 | Klinec .................. G01N 35/02 250/564 |
| 2014/0340869 | A1* | 11/2014 | Wang ...................... F21K 9/00 362/84 |
| 2019/0316963 | A1 | 10/2019 | Ishida et al. |

FOREIGN PATENT DOCUMENTS

| | | | |
|---|---|---|---|
| JP | 2006-215026 | A | 8/2006 |
| JP | 3964291 | B2 | 8/2007 |
| JP | 2008-2849 | A | 1/2008 |
| JP | 2008-46031 | A | 2/2008 |
| JP | 2008-519266 | A | 6/2008 |
| JP | 2009-14602 | A | 1/2009 |
| JP | 2009-168478 | A | 7/2009 |
| JP | 2011-237384 | A | 11/2011 |
| JP | 6294186 | B2 | 3/2018 |
| JP | 2018-105739 | A | 7/2018 |
| KR | 20160088980 | A | 7/2016 |
| WO | 2006052682 | A2 | 5/2006 |

OTHER PUBLICATIONS

Chinese Office Action issued on Feb. 25, 2025 for Chinese Patent Application No. 202080076906.5.
International Search Report for PCT Application No. PCT/JP2020/038063 mailed Dec. 28, 2020. 3 pages.
Indian Office Action issued on Aug. 29, 2022 for Indian Patent Application No. 202217025627.
Extended European Search Report issued on Oct. 29, 2024 for European Patent Application No. 24192496.8.

* cited by examiner

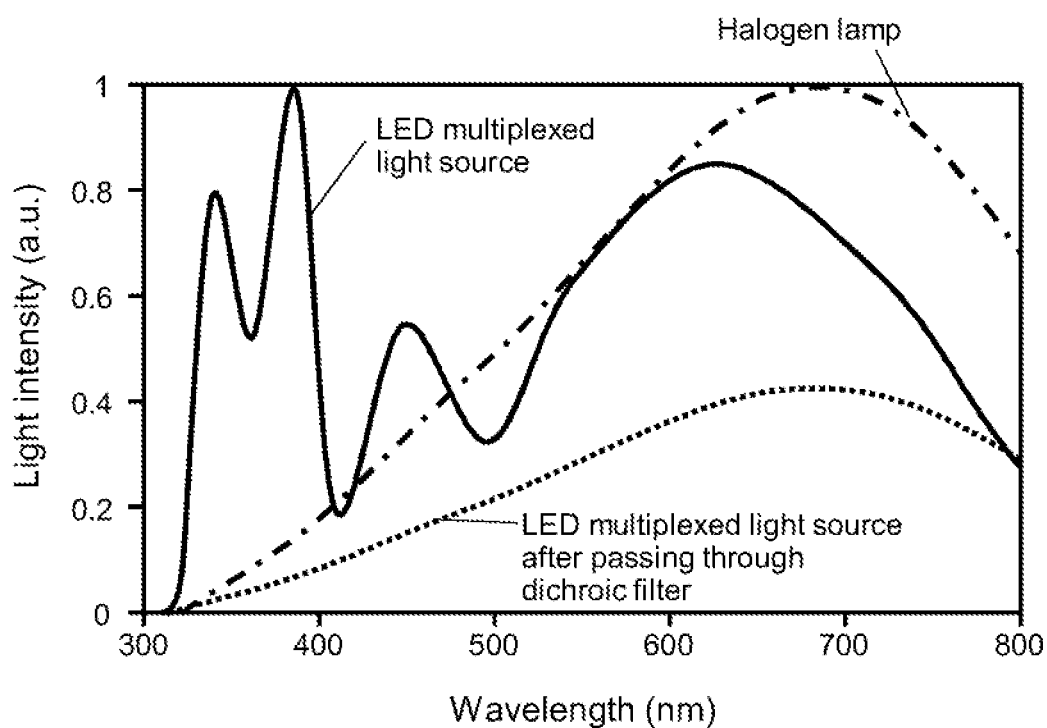

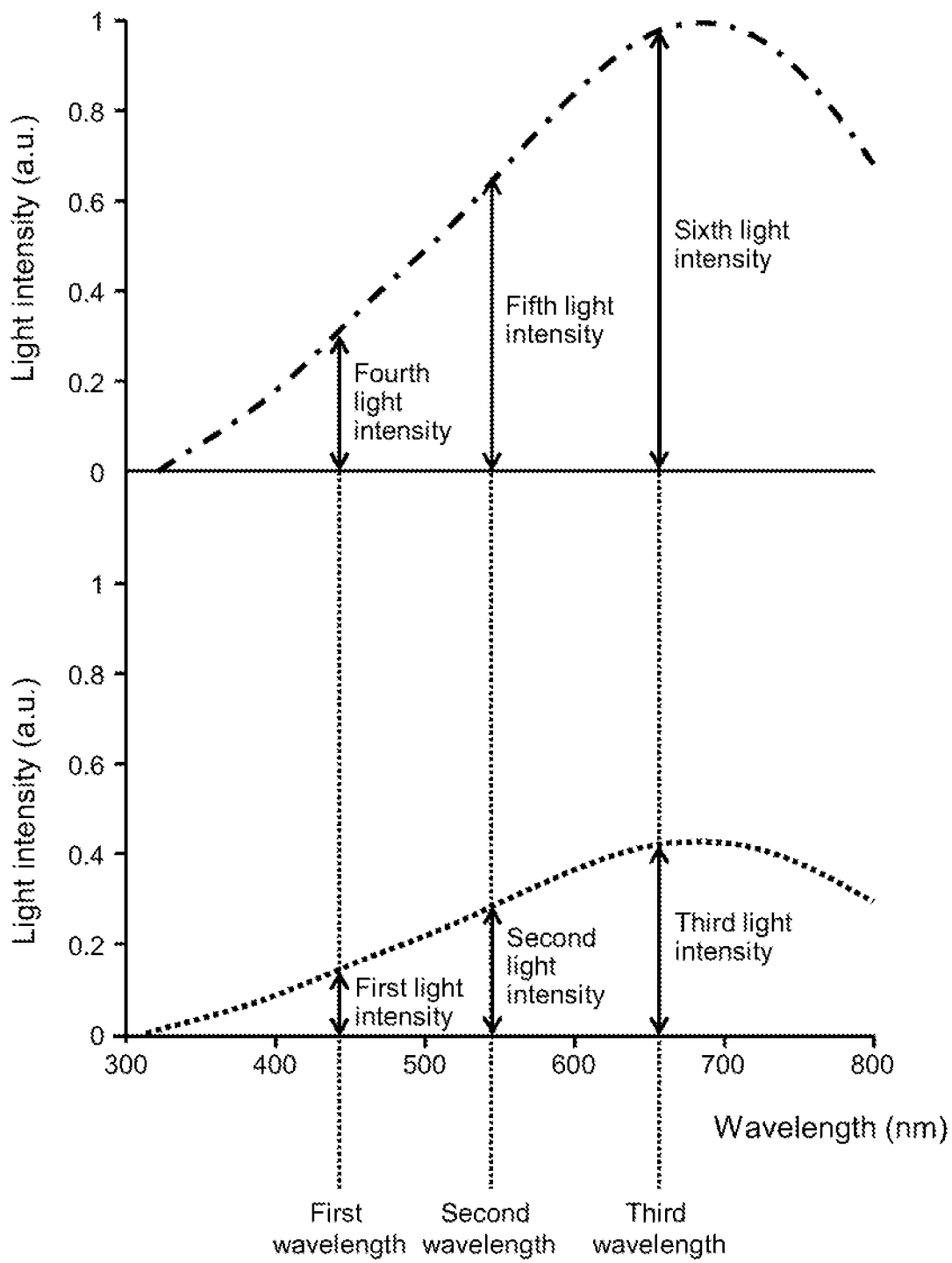

AUTOMATIC ANALYSIS DEVICE

TECHNICAL FIELD

The present disclosure relates to an automatic analyzer that analyzes amounts of components contained in a sample.

BACKGROUND ART

In an automatic analyzer that analyzes amounts of components, such as proteins, glucose, lipids, enzymes, hormones, inorganic ions, and disease markers, contained in a biological sample such as blood or urine, it is common to dispense a specimen and a reagent into a vessel for storing a liquid and to analyze inspection items based on changes in optical characteristics such as absorption, fluorescence, and luminescence. In absorption analysis using an automatic analyzer, a method is used in which: light from a light source is irradiated onto a sample or a reaction solution obtained by mixing the sample and a reagent; the intensity of transmitted light, having passed through the sample or the reaction solution and having a single or a plurality of measurement wavelengths, is measured by a light receiving element to calculate an absorbance; and the amount of a component is obtained from a relationship between absorbance and concentration.

It is desirable that the light source for the absorption analysis has a wide luminescence spectrum in order to handle a large number of inspection items. It is also desirable for such light source to stably obtain, at a measurement wavelength, a certain level or more of light intensity in order to perform absorbance measurement with high accuracy. Therefore, xenon lamps, halogen lamps, and others have been conventionally used. While each of these light sources can obtain a certain level or more of light intensity, a time until the light intensity is stabilized is relatively long, about 30 minutes. Furthermore, the larger the light intensity, the greater energy consumption, and the life is also limited. For example, in the case of a halogen lamp, it needs to be replaced for about every 1,000 hours, thereby increasing maintenance frequency for the automatic analyzer.

In recent years, light emitting diodes (hereinafter LEDs) expected to have a long life have been studied as a light source for absorption analysis. For example, PTL 1 describes a configuration in which halogen lamp light and ultraviolet LED light are multiplexed by a filter. Since a decrease in the light intensity of a halogen lamp is particularly remarkable for ultraviolet light, an ultraviolet LED is used in the literature. In the literature, it is further attempted that when halogen lamp light and ultraviolet LED light are multiplexed, a decrease in light intensity is monitored by using light that is partially reflected on a filter in order to maintain analysis performance with high accuracy.

When an LED is used as a light source for absorption analysis, there is a concern that the luminescence spectrum and the light intensity may be changed due to self-heating when lit or due to an environmental temperature, and then analysis accuracy may decrease. In order to prevent this, PTL 2 uses a temperature control block in which an LED photometer and a reaction cell (a member that stores a sample or a reaction solution) are in contact with each other. The literature aims to make a device compact by using an LED, and also controls a preheating temperature by fixing the light emitting element of the LED to a member having a large heat capacity. As a result, the LED element can be held at a temperature in a certain range without being affected by an outside air temperature and the self-heating. Therefore, a certain level or more of light intensity can be stably obtained.

In an automatic analyzer, a reagent and a wavelength of light to be used are different depending on a component to be measured. Its wavelength range is as wide as from 340 nm to 800 nm. Therefore, it is difficult to cover the entire wavelength band with one LED light, and thus a plurality of LEDs are used. As a method for absorption analysis using an automatic analyzer, a two-wavelength measurement method is known. In this method, the concentration of a measurement target is accurately quantified by simultaneously measuring lights of two wavelengths. In this measurement method, it is premised that for a reaction solution, an optical axis and a light intensity distribution of light of one wavelength respectively match with those of light of the other wavelength. When they do not match each other, the accurate quantitative effect of the two-wavelength measurement method cannot be obtained. For example, if the two-wavelength measurement method is performed using lights of two wavelengths whose optical axes or light intensity distributions do not match each other, the two-wavelength measurement method is more likely to be affected by a disturbance, such as an air bubble, than when they match each other. As a result, accuracy or reliability significantly decreases. Therefore, PTL 3 proposes a device in which an influence of a light source image, possibly caused by a light intensity distribution, is prevented from occurring by providing a slit between a light source and a reaction cell.

As described in examples above, when LEDs are used as light sources for absorption analysis using an automatic analyzer, each of an optical system and a temperature control system needs to be devised in order to obtain analysis performance with high accuracy.

CITATION LIST

Patent Literature

PTL 1: JP 6294186 B2
PTL 2: JP 3964291 B2
PTL 3: JP 2018-105739 A

SUMMARY OF INVENTION

Technical Problem

When LEDs are used as light sources for absorption analysis using an automatic analyzer, a certain level or more of light intensity must be obtained by respectively matching multiplexed optical axes and light intensity distributions of a plurality of LED lights in order to obtain analysis performance with high accuracy. In addition, in order to perform quantitative analysis with high accuracy by the two-wavelength measurement method, temperature characteristics of a plurality of LED light emitting elements must be matched. As a configuration for multiplexing a plurality of LED lights, vertical incidence by, for example, a filter can be considered. However, if temperature control of each LED light emitting element is independent when the plurality of LEDs are arranged by the vertical incidence, it is difficult to match the temperature characteristics of the respective LEDs.

The present disclosure has been made in view of the above problems, and an object of the present disclosure is to provide an automatic analyzer capable of obtaining a stable light intensity over a wide wavelength band by multiplexing a plurality of LED lights and capable of matching temperature characteristics of respective LED elements.

Solution to Problem

An automatic analyzer according to the present disclosure is configured such that light emitted from a second LED is reflected to be multiplexed on a same optical axis as light emitted from a first LED, and the first LED and the second LED are in contact with a same temperature adjustment member.

Advantageous Effects of Invention

According to the automatic analyzer of the present disclosure, a stable light intensity can be obtained over a wide wavelength band by multiplexing the first LED and the second LED on the same optical axis. In addition, by bringing the first LED and the second LED into contact with the same temperature adjustment member, the temperature characteristics of the respective LEDs can be matched with each other by a simple configuration. Problems, configurations, and advantageous effects other than those described above will be clarified by the following description of embodiments.

BRIEF DESCRIPTION OF DRAWINGS

FIG. 8A is a diagram showing an example of a spectrum when the transmittance of the dichroic filter is controlled.

FIG. 8B is a diagram illustrating the criteria for determining that the spectrum of the halogen lamp and the spectrum of the multiplexed light after transmission are similar.

DESCRIPTION OF EMBODIMENTS

First Embodiment

Figure 1:
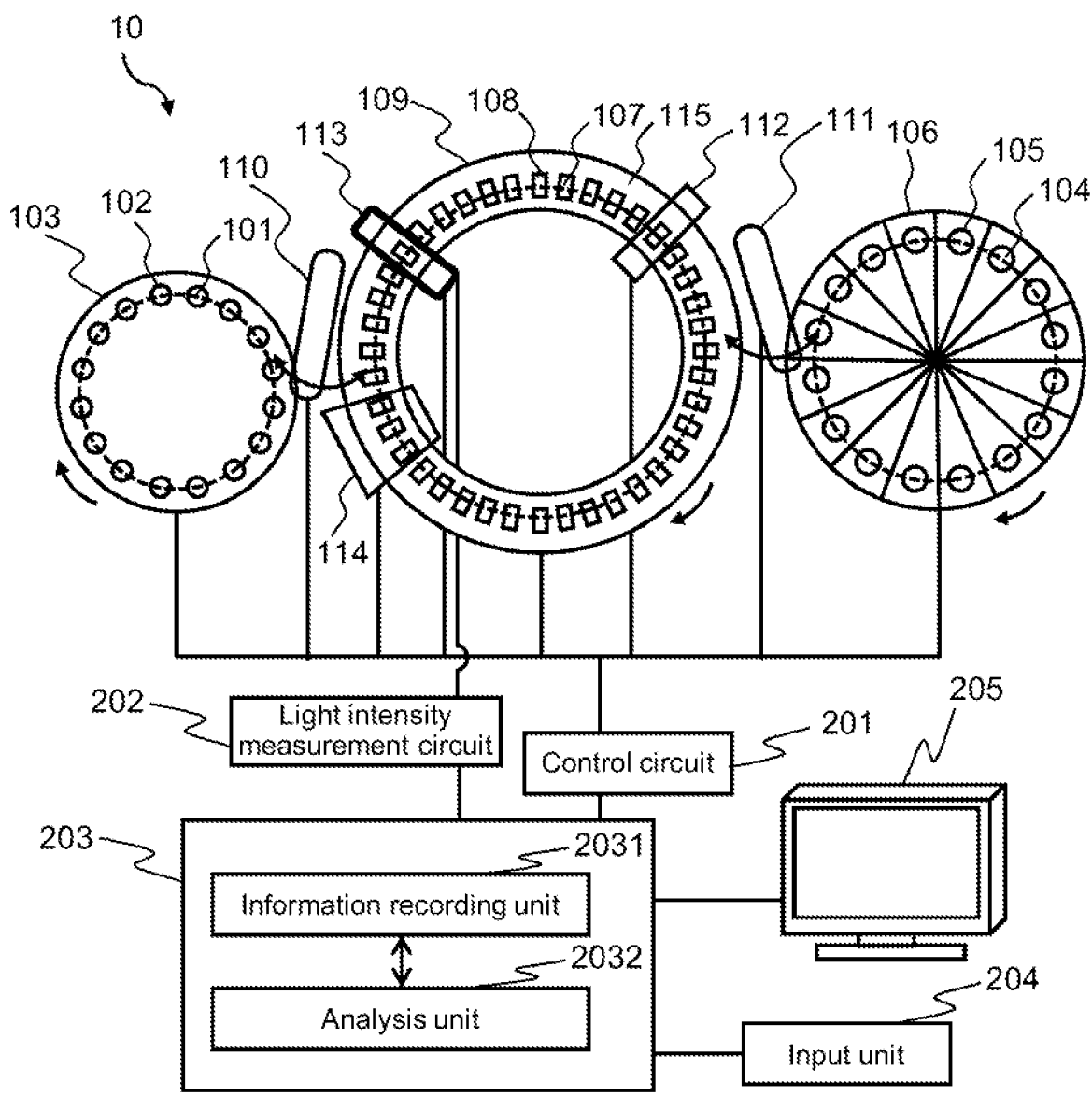
FIG. 1 is a schematic diagram showing an entire configuration of an automatic analysis device 10 according to a first embodiment.

FIG. 1 is a schematic diagram showing an entire configuration of an automatic analyzer 10 according to a first embodiment of the present disclosure. The automatic analyzer 10 is an apparatus that performs measurement by irradiating a sample with light. The automatic analyzer 10 includes a sample disk 103, a reagent disk 106, a reaction disk 109, a dispensing mechanism, a control circuit 201, a light intensity measurement circuit 202, a data processing unit 203, an input unit 204, and an output unit 205.

The dispensing mechanism moves a sample or a reagent between the disks. The control circuit 201 controls each disk and the dispensing mechanism. The light intensity measurement circuit 202 measures an absorbance of a reaction solution. The data processing unit 203 processes data measured by the light intensity measurement circuit 202. The input unit 204 and the output unit 205 are interfaces with the data processing unit 203. The dispensing mechanism includes a sample dispensing mechanism 110 and a reagent dispensing mechanism 111.

The data processing unit 203 includes an information recording unit 2031 and an analysis unit 2032. The information recording unit 2031 stores control data, measurement data, data to be used for data analysis, analysis result data, and the like. The data processing unit 203 may be realized using a computer. The computer includes at least a processor such as a central processing unit (CPU) and the information recording unit 2031. The processing of the analysis unit 2032 may be realized by storing program codes corresponding to the data processing in the information recording unit 2031 and by the processor executing the program codes.

The input unit 204 and the output unit 205 input and output data to and from the information recording unit 2031. The input unit 204 can be configured by an information input device such as a keyboard, a touch panel, or a numeric keypad. The output unit 205 is a device for a user of the automatic analyzer 10 to confirm the analysis results. The output unit 205 is, for example, a display or the like.

On a circumference in the sample disk 103, a plurality of sample cups 102, which are vessels for storing a sample 101, are arranged. The sample 101 is, for example, blood. On a circumference in the reagent disk 106, a plurality of reagent bottles 105, which are vessels for storing a reagent 104, are arranged. On a circumference in the reaction disk 109, a plurality of reaction cells 108 (reaction vessels), which are vessels for storing a reaction solution 107 obtained by mixing the sample 101 and the reagent 104, are arranged.

The sample dispensing mechanism 110 is a mechanism to be used when a certain amount of the sample 101 is moved from the sample cup 102 to the reaction cell 108. The sample dispensing mechanism 110 includes, for example, a nozzle that discharges or sucks a solution, a robot that positions and conveys the nozzle at a predetermined position, a pump that discharges or sucks a solution to or from the nozzle, and a flow path connecting the nozzle and the pump.

The reagent dispensing mechanism 111 is a mechanism to be used when a certain amount of the reagent 104 is moved from the reagent bottle 105 to the reaction cell 108. The reagent dispensing mechanism 111 also includes, for example, a nozzle that discharges or sucks a solution, a robot that positions and conveys the nozzle at a predetermined position, a pump that discharges or sucks a solution to or from the nozzle, and a flow path connecting the nozzle and the pump.

An agitating unit 112 is a mechanism unit that agitates and mixes the sample 101 and the reagent 104 in the reaction cell 108. A cleaning unit 114 is a mechanism unit that discharges the reaction solution 107 from the reaction cell 108 where the analysis process is completed, and then cleans the reaction cell 108. The next sample 101 is dispensed again from the sample dispensing mechanism 110 into the cleaned reaction cell 108, and a new reagent 104 is dispensed from the reagent dispensing mechanism 111. The reaction cell 108 is thereby used for another reaction processing.

In the reaction disk 109, the reaction cell 108 is immersed in a constant temperature fluid 115 in a constant temperature bath whose temperature and flow rate are controlled. As a result, the temperatures of the reaction cell 108 and of the reaction solution 107 therein are kept at a constant temperature by the control circuit 201 even while they are being moved by the reaction disk 109. Water or air, for example, is used for the constant temperature fluid 115.

An absorbance measurement unit (absorption photometer) 113 that performs absorption analysis on the sample 101 is arranged on a part of the circumference in the reaction disk 109.

Figure 2:
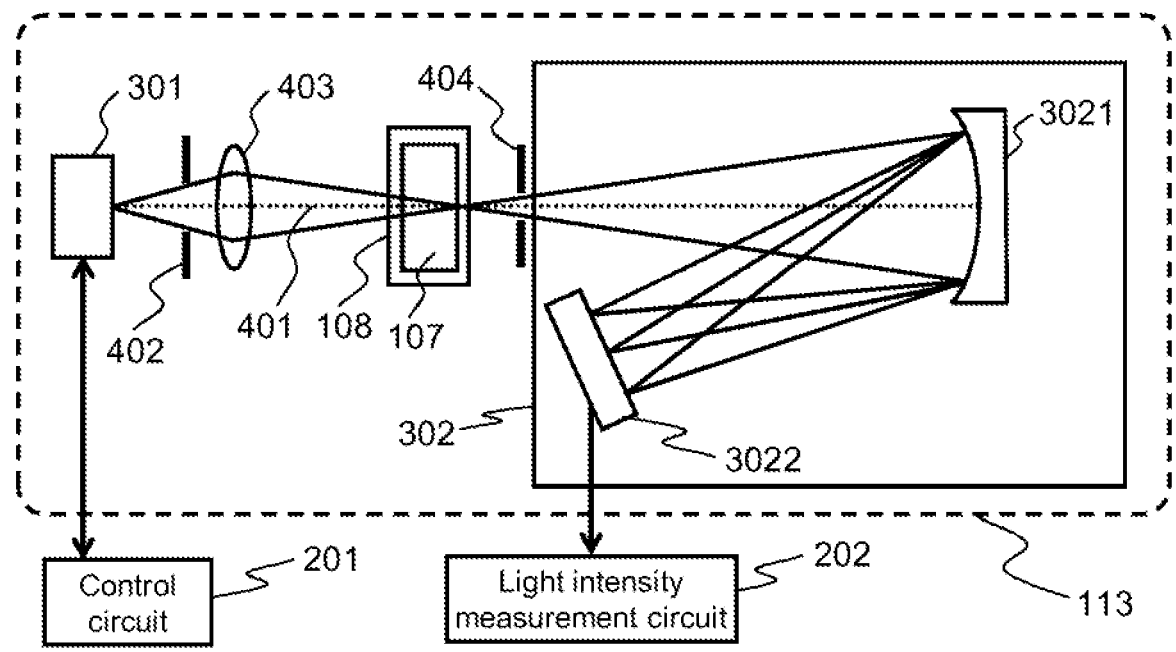
FIG. 2 is a diagram showing a configuration example of an absorbance measurement unit 113.

FIG. 2 is a diagram showing a configuration example of the absorbance measurement unit 113. The irradiation light generated from a light source unit 301 is emitted along an optical axis 401, is focused by a focusing lens 403, and is irradiated to the reaction cell 108. At this time, the width of the light emitted from the light source unit 301 may be limited by arranging a light source side slit 402 in order to uniformize a light intensity distribution in the light irradiation surface.

The light transmitted through the reaction solution 107 in the reaction cell 108 is separated by a diffraction grating 3021 in a spectroscope 302, and is received by a detector array 3022 including a large number of light receivers. At this time, the light that has not passed through the reaction solution 107 becomes noise. Therefore, a spectrometer side slit 404 may be arranged to prevent such stray light from entering the spectroscope 302.

Examples of the measurement wavelength of the light received by the detector array 3022 include 340 nm, 376 nm, 405 nm, 415 nm, 450 nm, 480 nm, 505 nm, 546 nm, 570 nm, 600 nm, 660 nm, 700 nm, 750 nm, and 800 nm. The reception signals of the lights received by these light receivers are transmitted to the information recording unit 2031 of the data processing unit 203 through the light intensity measurement circuit 202.

The amounts of components, such as proteins, glucose, and lipids, contained in the sample 101 are calculated by the following procedure. First, the control circuit 201 instructs the cleaning unit 114 to clean the reaction cell 108. Next, the control circuit 201 causes the sample dispensing mechanism 110 to dispense a certain amount of the sample 101 in the sample cup 102 into the reaction cell 108. Next, the control circuit 201 causes the reagent dispensing mechanism 111 to dispense a certain amount of the reagent 104 in the reagent bottle 105 into the reaction cell 108.

When the respective solutions are dispensed, the control circuit 201 causes drive units, respectively corresponding to the disks, to rotationally drive the sample disk 103, the reagent disk 106, and the reaction disk 109. At this time, the sample cup 102, the reagent bottle 105, and the reaction cell 108 are positioned at predetermined dispensing positions according to drive timings of the corresponding dispensing mechanisms respectively.

Subsequently, the control circuit 201 controls the agitating unit 112 to agitate the sample 101 and the reagent 104 dispensed into the reaction cell 108, thereby generating the reaction solution 107. By the rotation of the reaction disk 109, the reaction cell 108 storing the reaction solution 107 passes through a measurement position where the absorbance measurement unit 113 is arranged. Each time passing through the measurement position, the intensity of the light transmitted from the reaction solution 107 is measured via the absorbance measurement unit 113. The measured data is sequentially output to the information recording unit 2031 and is accumulated as reaction process data.

During the accumulation of the reaction process data, another reagent 104, if necessary, is additionally dispensed into the reaction cell 108 by the reagent dispensing mechanism 111, and is agitated by the agitating unit 112, and measurement is further performed for a certain period of time. As a result, the reaction process data acquired at constant time intervals are stored in the information recording unit 2031.

Figure 3:
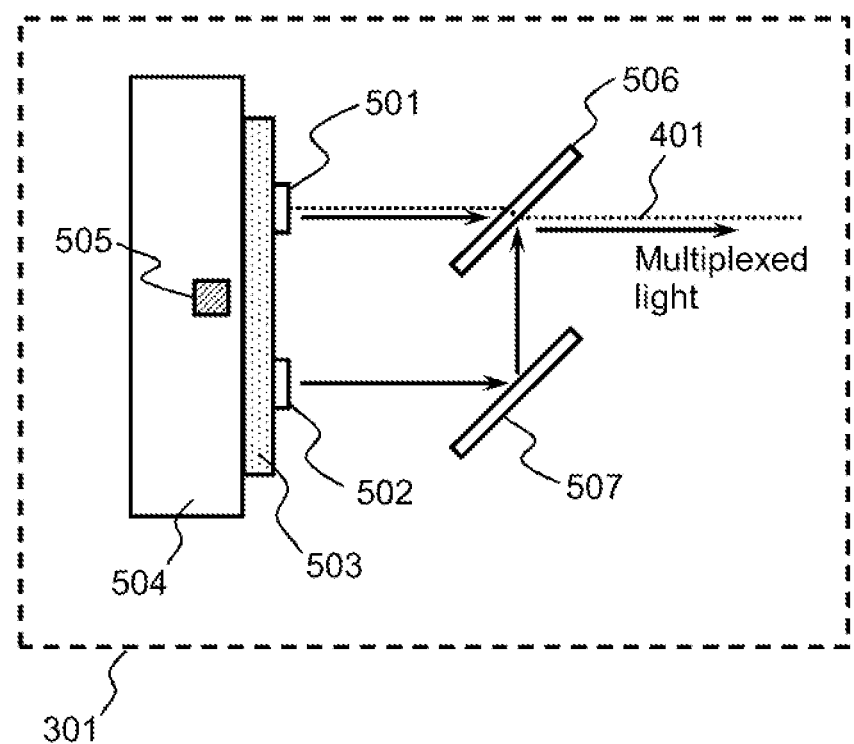
FIG. 3 is a diagram showing a configuration example of a light source unit 301.

FIG. 3 is a diagram showing a configuration example of the light source unit 301. A first LED 501 and a second LED 502 are mounted on an LED mounting substrate 503. The LED mounting substrate 503 has a role of supplying electric power to the first LED 501 and the second LED 502 and balancing the temperatures of the LED elements and the temperature of a temperature adjustment unit 504. From the viewpoint of thermal conductivity, the LED mounting substrate 503 is preferably made of something whose base material is a metal such as aluminum or copper. Since the first LED 501 and the second LED 502 are mounted on one LED mounting substrate 503 having a high thermal conductivity, common temperature fluctuation characteristics can be obtained by temperature control of the temperature adjustment unit 504. A temperature set for the temperature adjustment unit 504 is, for example, 37° C. Each LED element is kept at a constant temperature by controlling the temperature adjustment unit 504 according to the temperature acquired by a temperature sensor 505 installed inside the temperature adjustment unit 504 or near the LED mounting substrate 503. The temperature sensor 505 can be configured by, for example, a thermistor, a thermocouple, a resistance thermometer, or the like.

As the temperature adjustment unit 504, a metal block through which a constant temperature fluid flows, or a Peltier element, for example, can be used. In the case of a Peltier element, the LED side of the temperature adjustment unit 504 (the back surface of the LED mounting substrate 503) can be controlled to, for example, about 37±0.01° C. via the control circuit 201 by feedback control of the temperature sensor 505. According to this configuration, the element temperature of the first LED 501 and the element temperature of the second LED 502 are equivalent in a certain range. Then it is possible to perform quantitative analysis with high accuracy when the automatic analyzer 10 perform the two-wavelength measurement method.

On the other hand, when the first LED 501 and the second LED 502 are mounted on one piece of LED mounting substrate 503, a strict design tolerance is required in order to make the optical axes of the two LEDs match each other. Design tolerances are required not only for the position of the light emitting element of the LED and the mounting position of the package of the LED on the substrate, but also for a filter and a mirror to be used for multiplexing the two LED lights.

In the first embodiment, LED light in a wavelength band whose light intensity is not sufficient is used as the first LED 501 to secure a light intensity by making the LED light linearly incident on the spectroscope 302, and LED light in a wavelength band whose light intensity is sufficient is used as the second LED 502 to make the LED light incident on the spectroscope 302 through two-step reflection, as shown in FIG. 3. A dichroic filter 506, on which light is incident at an incident angle of 45°, is arranged on the optical path of the first LED 501. A reflector 507 such as a mirror, on which light is incident at an incident angle of 45°, is further arranged on the optical path of the second LED 502.

The light emitted from the second LED 502 is reflected in two steps on each of the reflector 507 and the dichroic filter 506, is then multiplexed with the light emitted from the first LED 501, and is incident on the spectroscope 302 through a path along the optical axis 401. At this time, it is desirable that: only the optical axis of the first LED 501 is designed to match the optical axis 401 of light to be incident on the spectroscope 302; and the light emitted from the second LED 502 is made incident after its luminous flux range is expanded by a diffusion plate. Details will be described in a second embodiment.

Figure 4:
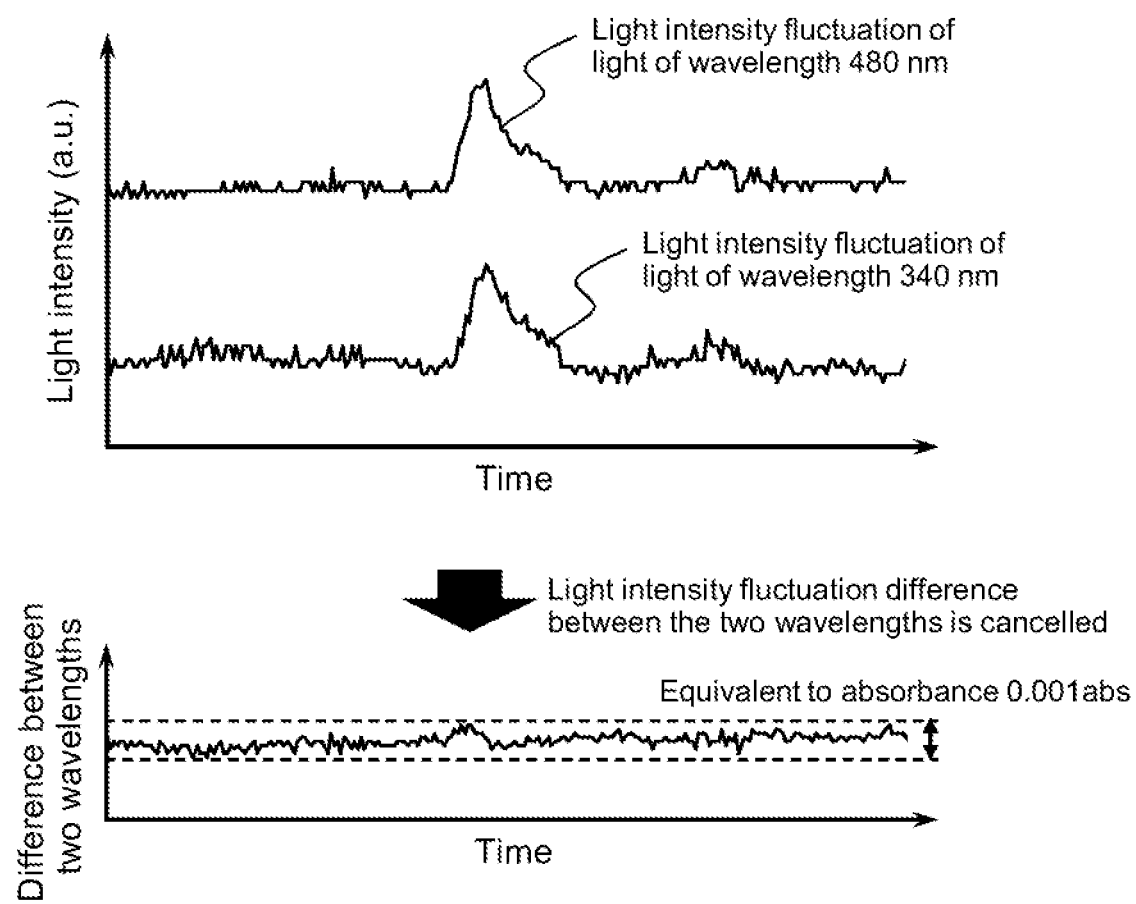
FIG. 4 shows an example of a result of light intensity fluctuation when two kinds of LEDs are mounted on the same aluminum substrate and the temperature is controlled.

FIG. 4 shows an example of a result of light intensity fluctuation when two kinds of LEDs are mounted on the same aluminum substrate and the temperature is controlled. The measurement time is for about 20 minutes. A white LED light source (driven at a current of 600 mA) that emits light having a wavelength of about 370 nm to 800 nm was used as the first LED 501. An ultraviolet LED light source (driven at a current of 120 mA) that emits light having a wavelength of 340 nm was used as the second LED 502. The temperature adjustment unit 504 has a cooled surface (surface to be cooled by a Peltier element) of 20 mm×20 mm, and the cooled surface was controlled to 37±0.01° C.

As shown in the graphs of FIG. 4, in each of the LEDs, the light intensity fluctuates depending on the element and the environmental temperature (there is a portion where the light intensity fluctuation increases at the center of each of the upper graphs of FIG. 4). When the LEDs were mounted on the LED mounting substrate 503 made of aluminum having a high thermal conductivity, a positive correlation was observed between the characteristics over time of the intensity fluctuation of the light having a wavelength of 340 nm and the characteristics over time of the intensity fluctuation of the light having a wavelength of 480 nm. As a result, an effect of canceling a light intensity fluctuation difference between the two wavelengths, occurring due to a disturbance such as an air bubble, was confirmed (the light intensity fluctuation difference between the two wavelengths was within the equivalent of an absorbance of 0.001 Abs).

Figure 5:
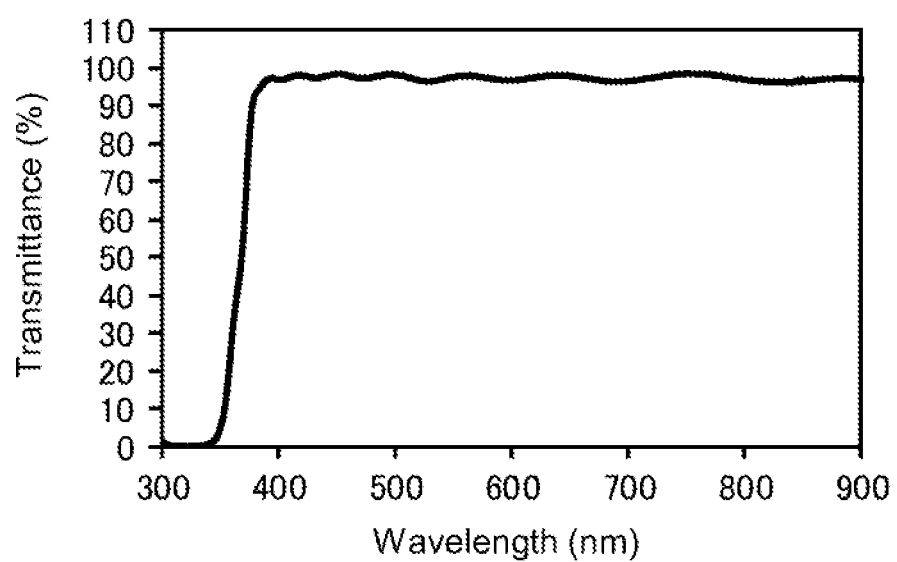
FIG. 5 is a diagram showing an example of the wavelength dependence of light transmittance of a dichroic filter.

FIG. 5 is a diagram showing an example of the wavelength dependence of the light transmittance of the dichroic filter. When a white LED light source that emits light having a wavelength of about 370 nm to 800 nm is used as the first LED 501 and an ultraviolet LED light source that emits light having a wavelength of 340 nm is used as the second LED 502, the dichroic filter 506 desirably uses a filter that reflects the light having a wavelength of 340 nm and allows the light having a long wavelength of from about 370 nm to 800 nm to pass through, as illustrated in FIG. 5. As a result, desired characteristics of multiplexed light can be obtained.

First Embodiment: Summary

In the automatic analyzer 10 according to the first embodiment, a light intensity is secured by making LED light (the first LED 501) in a wavelength band whose light intensity is not sufficient linearly incident on an analysis unit; and a constant attenuation in the light intensity of LED light (the second LED 502) in a wavelength band whose light intensity is sufficient is allowable, so that the LED light is multiplexed with the light emitted from the first LED 501 by two-step reflection. As a result, a wide wavelength range can be secured and a light intensity can be secured, so that high analysis performance can be maintained over a wide wavelength range.

In the automatic analyzer 10 according to the first embodiment, the first LED 501 and the second LED 502 are mounted on one LED mounting substrate 503, and the temperature of the LED mounting substrate 503 is controlled by the temperature adjustment unit 504. As a result, the temperature of the first LED 501 and the temperature of the second LED 502 can be controlled to be substantially the same, and a light intensity fluctuation difference between the LEDs can be suppressed. Therefore, in the limited internal space of the automatic analyzer 10, a stable light intensity can be obtained while the space of the temperature adjustment unit 504 is suppressed.

Second Embodiment

Figure 6A:
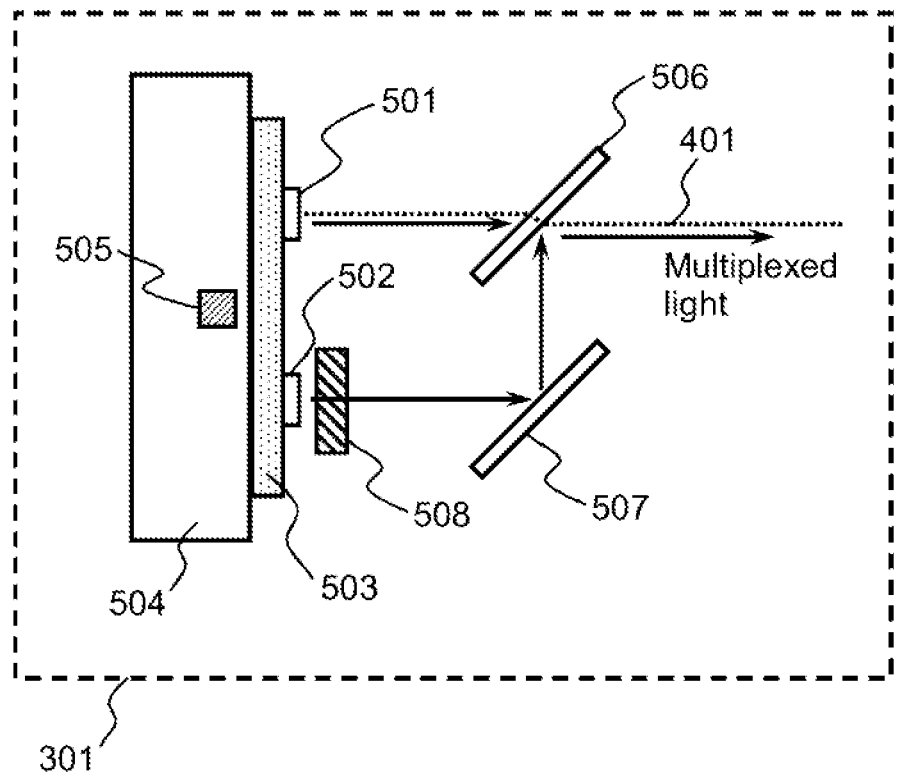
FIG. 6A is a configuration example of a light source unit 301 included in an automatic analysis device 10 according to a second embodiment.

FIG. 6A is a configuration example of a light source unit 301 included in an automatic analyzer 10 according to a second embodiment of the present disclosure. In the second embodiment, a light intensity distribution of the light emitted from the second LED 502 is made uniform on the light receiving surface of the light receiver of the spectroscope 302 by diffusing the light emitted from the second LED 502. The other configurations are similar to those of the first embodiment.

When the effective light emitting area of a LED light source is set to 1.0 mm square, it is necessary to design such that only the optical axis of the first LED 501 matches the optical axis 401 of the light to be incident on the spectroscope 302 in order to obtain a light intensity that enables quantitative analysis with high accuracy. In this case, however, it is difficult to match the optical axis of the light emitted from the second LED 502 with the optical axis 401 of the light to be incident on the spectroscope 302. Then, it becomes difficult to match, between the LEDs, the optical axes and the light intensity distributions for a reaction solution. This may decrease the measurement accuracy of the two-wavelength measurement method. Therefore, in the second embodiment, a diffusion plate 508 that expands the effective light emitting area of the second LED 502 is arranged before the reflector 507 on which light is incident.

Figure 6B:
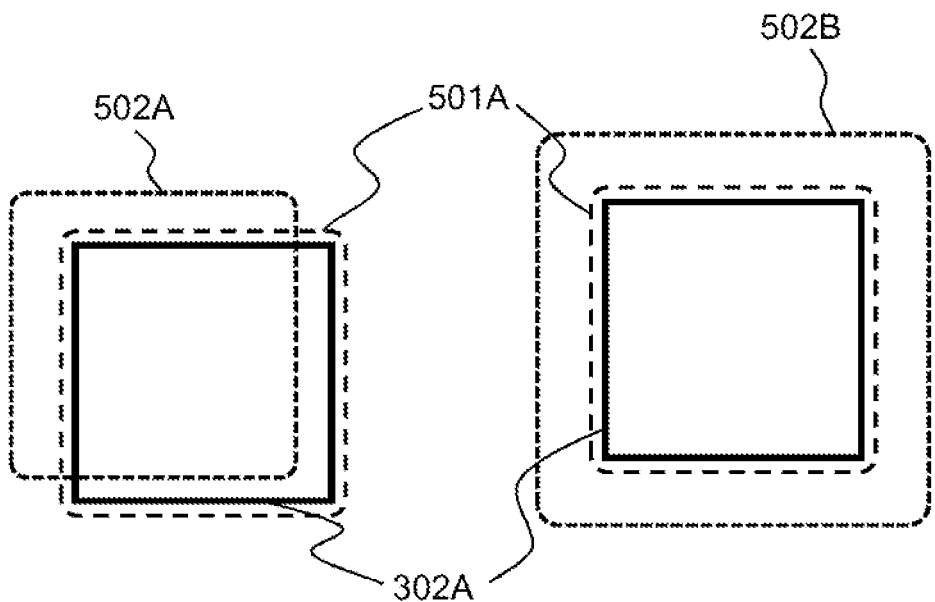
FIG. 6B is a schematic diagram illustrating an effect obtained by using a diffusion plate 508.

FIG. 6B is a schematic diagram illustrating an effect obtained by using the diffusion plate 508. It is assumed that the light emitted from the first LED 501 is diffused in a range 501A on a light receiving surface 302A of the spectroscope 302. It is assumed that when the diffusion plate 508 is not used, the light emitted from second LED 502 is diffused in a range 502A. If the optical axes of the LEDs are misaligned with each other, a portion where both the emitted light overlap each other and a portion where they do not overlap each other are created on the light receiving surface 302A (left diagram in FIG. 6B). As a result, the in-plane distribution of the light intensity becomes non-uniform on the light receiving surface 302A.

When the diffusion plate 508 is used, the light emitted from the second LED 502 is diffused in a range 502B that encompasses the range 501A. As a result, both the emitted lights overlap each other on the light receiving surface 302A, and the in-plane distribution of the light intensity can be made uniform on the light receiving surface 302A. That is, the diffusion plate 508 is desirably configured such that the range 502B encompasses the range 501A on light receiving surface 302A.

Figure 7:
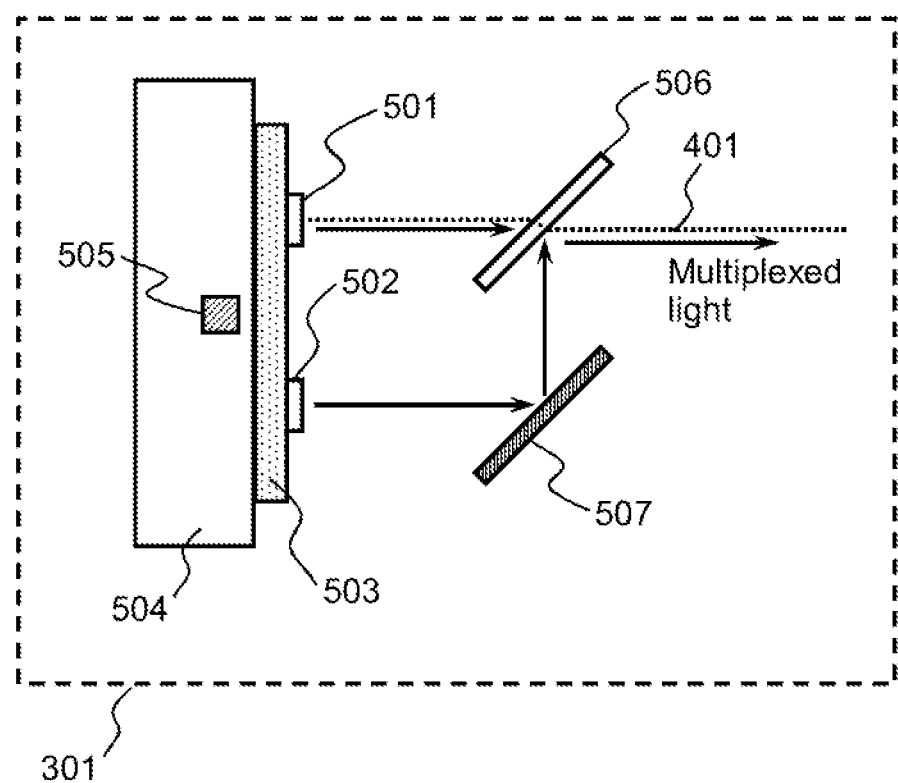
FIG. 7 is another configuration example of the light source unit 301 in the second embodiment.

FIG. 7 is another configuration example of the light source unit 301 in the second embodiment. In FIG. 7, surface processing for light diffusion is applied on the reflector 507 itself instead of the diffusion plate 508. As a result, the luminous flux range can be expanded by taking advantage of the second LED 502 having a sufficient light intensity, and the light intensity distribution can be made uniform on the light receiving surface 302A. Furthermore, the light emission position of the second LED 502 can be regarded as the position of the reflector 507. Accordingly, the distance from the spectroscope 302 to the emission position of the first LED 501 and the distance (i.e., focal length) from the spectroscope 302 to the emission position of the second LED 502 become equal, and the light intensity distributions become closer, which is preferable.

FIG. 8A is a diagram showing an example of a spectrum when the transmittance of the dichroic filter is controlled. Conventionally, a halogen lamp, for example, is used as a light source for absorption analysis using an automatic analyzer. It is expected that if the same spectrum as that of the halogen lamp can be reproduced, results of the analysis performance will be close to those of the halogen lamp case. Therefore, it is desirable that the spectrum of the multiplexed light of the first LED 501 and the second LED 502 is made close to the spectrum of halogen lamp light as much as possible. In the present disclosure, a transmittance at an arbitrary wavelength can be adjusted by adjusting the transmission characteristic of the dichroic filter 506. The transmittance adjustment can be realized, for example, by controlling the film thickness of the dichroic filter 506.

The multiplexed light of the first LED 501 and the second LED 502 has a spectrum as indicated, for example, by a solid line in FIG. 8A. By adjusting the transmission characteristic of the dichroic filter 506, the spectrum of the multiplexed light can be adjusted as indicated by a dotted line in FIG. 8A. As a result, the spectrum shape of the multiplexed light becomes close to the spectrum shape (dashed line in FIG. 8A) of the halogen lamp.

When the halogen lamp is compared with the multiplexed light after transmission, the multiplexed light after transmission has a wavelength band in which the light intensity is insufficient. An increase in the LED light intensity can be expected by the temperature adjustment unit 504 lowering the temperature of the LED element. As a result, the light intensity of the multiplexed light after transmission can be increased over the entire spectrum range, and the spectrum can be further made closer to the halogen lamp. For example, a general ultraviolet LED has a light intensity fluctuation of about 5% in all wavelengths when the temperature is changed by 10° C.

FIG. 8B is a diagram illustrating the criterion for regarding the spectrum of the halogen lamp and the spectrum of the multiplexed light after transmission as being similar. The upper part of FIG. 8B shows the spectrum of the halogen lamp in FIG. 8A, and the lower part of FIG. 8B shows the spectrum of the multiplexed light after transmission in FIG. 8A. In order to determine that both spectra are similar to each other, it is sufficient that light intensity ratios between wavelengths match each other between the spectra. Specific description will be given using the example of FIG. 8B. Although FIG. 8B shows that the light intensity ratio is constant in the entire wavelength range, it is sufficient that the light intensity ratios between wavelengths match each other between spectra only at the wavelengths to be used for the measurement.

The spectrum of the multiplexed light after transmission has a first light intensity at a first wavelength, a second light intensity at a second wavelength, and a third light intensity at a third wavelength. The spectrum of the halogen lamp light has a fourth light intensity at the first wavelength, a fifth light intensity at the second wavelength, and a sixth light intensity at the third wavelength. Note that each of the wavelengths and light intensities used in the drawing is an example only for description.

When a ratio (first ratio) of the second light intensity to the first light intensity and a ratio (second ratio) of the fifth light intensity to the fourth light intensity match each other or a difference between the first ratio and the second ratio falls within an allowable range, both the spectra can be regarded as being similar in the wavelength range from the first wavelength to the second wavelength.

Similarly, when a ratio (third ratio) of the third light intensity to the second light intensity and a ratio (fourth ratio) of the sixth light intensity to the fifth light intensity match each other or a difference between the third ratio and the fourth ratio falls within an allowable range, both the spectra can be regarded as being similar in the wavelength range from the second wavelength to the third wavelength. This allowable range is desirably set to be the same as the allowable range in the difference between the first ratio and the second ratio. This is because light intensity ratios between wavelengths are desirably identical between spectra regardless of the magnitudes of the light intensities.

For convenience of description, FIG. 8B illustrates an example in which light intensity ratios between the spectra are compared at three wavelengths. It can be said that the more the wavelengths at which comparisons are made, the more similar both spectra are. When light intensity ratios between spectra are similarly compared at, for example, 12 wavelengths and each of the light intensity ratios falls within an allowable range, both the spectra can be regarded as being similar.

Second Embodiment: Summary

The automatic analyzer 10 according to the second embodiment is configured such that the range 502B encompasses the range 501A on the light receiving surface 302A by diffusing the light emitted from the second LED 502. As a result, the in-plane distribution of the light intensity of each LED can be made uniform on the light receiving surface 302A.

In the automatic analyzer 10 according to the second embodiment, the dichroic filter 506 is configured such that a light intensity ratio between wavelengths on the spectrum of the multiplexed light matches a light intensity ratio between the same wavelengths on the spectrum of the halogen lamp (or a difference between the light intensity ratios at the same wavelength falls within an allowable range). As a result, the spectrum of the multiplexed light after transmission becomes similar to the spectrum of the halogen lamp, so that even when LED light sources are used, characteristics can be obtained which are close to the analysis performance when the halogen lamp is used.

Third Embodiment

In order to stably obtain the analysis performance in the absorption analysis using the automatic analyzer 10, it is preferable that the light intensity of the light source unit 301 is always constant. As a means to keep the light intensity constant, temperature control of the LED mounting substrate 503 and drive current control of an LED can be used. Therefore, in a third embodiment of the present disclosure, a control procedure for stabilizing the light intensity of an automatic analyzer 10 will be described. The configuration of the automatic analyzer 10 is similar to that of each of the first and second embodiments.

For example, an AlGaN crystal that is a compound semiconductor is used as an LED that generates ultraviolet light having a wavelength of 340 nm or less. When the AlGaN crystal is used as a light emitting layer, the luminous efficiency of an ultraviolet LED is as low as from a few tenth to a few hundredth, as compared with the luminous efficiency of an InGaN crystal used for a light emitting layer of a general white LED. The light emitting layer of the AlGaN crystal has a feature that most of the input power becomes heat. The higher the operating temperature of an LED and the longer the operating time thereof, the more defects are formed in a semiconductor crystal, so that the light intensity decreases over time. Therefore, the life of an LED using an AlGaN crystal tends to be shorter than that of an LED using an InGaN crystal. In a commercially available LED, the specification value of the time L70 when the light intensity decreases to 70% is usually determined when the LED is used under a condition in which the lower surface temperature of a package is 25° C. In the case of an LED that generates ultraviolet light having a wavelength of 340 nm or less, L70 is 10,000 hours or longer, but it is known that L70 is shortened according to the Arrhenius model as the operating temperature rises. That is, when the LED is used at a lowered temperature, the light intensity can be increased, and the life can also be extended. The light intensity of the LED can also be increased by increasing a drive current.

Figure 9:
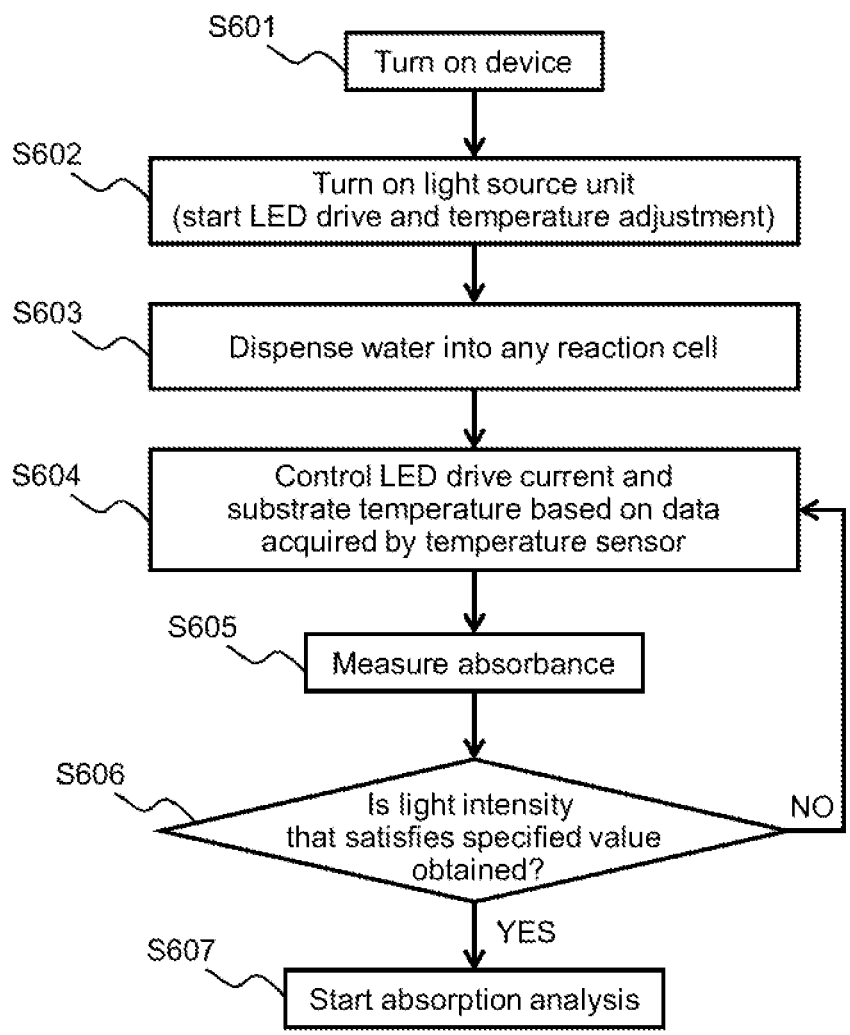
FIG. 9 is a flowchart illustrating a procedure for stabilizing the light intensity of the automatic analysis device 10.

FIG. 9 is a flowchart illustrating a procedure for stabilizing the light intensity of the automatic analyzer 10. After the analyzer is started (S601) and the light source unit 301 is operated (S602), water is dispensed into an arbitrary reaction cell (S603). The control circuit 201 controls the LED drive current and the substrate temperature according to the temperature data acquired from the temperature sensor 505 (S604). The control circuit 201 measures an absorbance by the absorbance measurement unit 113 (S605), and acquires light intensity data of the light intensity measurement circuit 202 from the information recording unit 2031 (S606). When it is determined that the light intensity in the specified range cannot be obtained, that is, the light intensity has decreased, the process returns to S604 to control the LED drive current and the temperature of the LED mounting substrate 503, thereby obtaining the specified light intensity. When the specified light intensity is obtained, absorption analysis is started (S607).

Figure 10:
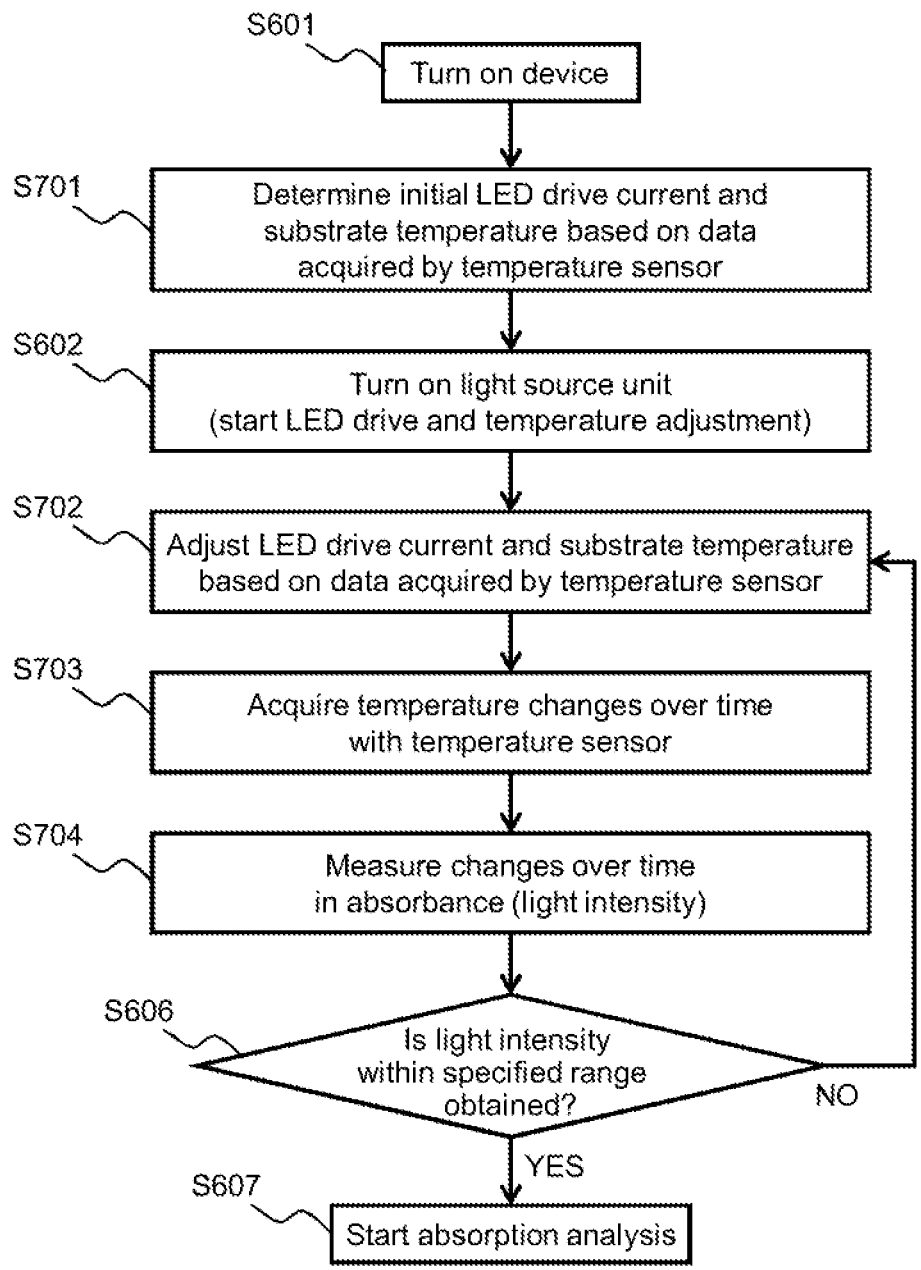
FIG. 10 is a flowchart illustrating another procedure for stabilizing the light intensity of the automatic analysis device 10.

FIG. 10 is a flowchart illustrating another procedure for stabilizing the light intensity of the automatic analyzer 10. The present flowchart can be used to shorten the start-up time of the automatic analyzer 10. The same processes as those of FIG. 9 are denoted by the same step numbers. The control circuit 201 determines the LED drive current and the substrate temperature at the initial stage of the analyzer start-up according to the temperature data acquired by the temperature sensor 505 (S701). The analysis unit 2032 acquires changes in temperature data over time from the temperature sensor 505 (S703). The control circuit 201 measures absorbance changes over time by the absorbance measurement unit 113 (S704). When the specified light intensity is not obtained, the process returns to S702 to adjust the LED drive current and the substrate temperature (S606).

For example, when the temperature of the LED mounting substrate 503 is PID controlled by a Peltier element, the PID parameter is determined based on the temperature data in the adjustment process of S702. When the environmental temperature is set to 25° C. and a temperature target value is set to 37° C., it takes time to stabilize the temperature if the temperature target is set to 37° C. Therefore, when the temperature data changes over time are gentle (i.e., it is likely to take time to stabilize the light intensity), the temperature target value is set to be higher than the original target value (e.g., set to be 42° C.). This makes it possible to quickly reach the target temperature. That is, the time until the light intensity becomes stable can be shortened by dynamically changing the target temperature according to the temperature changes over time.

Modifications of the Present Disclosure

The present disclosure is not limited to the embodiments described above, and includes various modifications. The above examples have been described in detail, for example, for easy understanding of the present disclosure, and they are not necessarily limited to those including all the configurations described above. In addition, a part of the configuration of an embodiment can be replaced with the configuration of another embodiment, or the configuration of an embodiment can be added with the configuration of another embodiment. In addition, a part of the configuration of each embodiment can be added or replaced with another configuration, or deleted.

Figure 11:
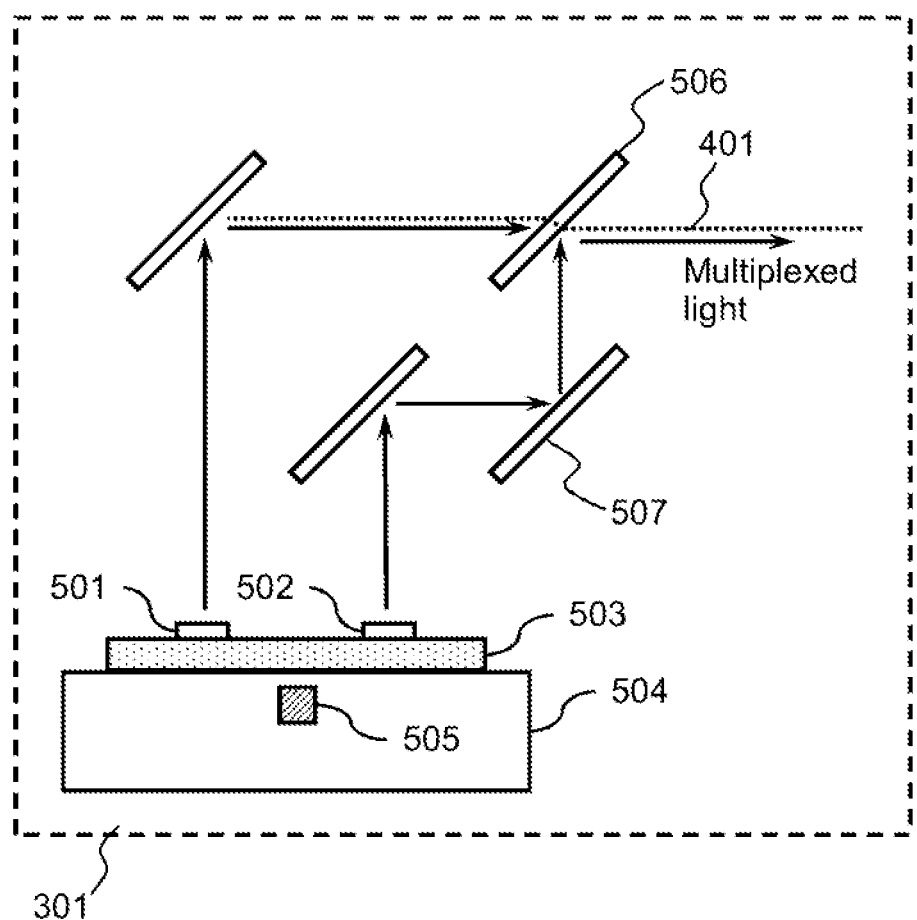
FIG. 11 is a modification of the light source unit 301.

FIG. 11 is a modification of the light source unit 301. The first LED 501 does not necessarily emit light in parallel with the multiplexed light, and as shown in FIG. 12, for example, the optical path of the light emitted from the first LED 501 may be changed by reflecting with a mirror or the like. Even in this case, the light emitted from the second LED 502 needs to be reflected more times than the light emitted from the first LED 501 in order to multiplex the light emitted from the second LED 502 with the light emitted from the first LED 501. It is because the number of times of reflection of the light from the second LED 502 having a larger light intensity should be larger, considering that the light intensity decreases every time the light is reflected.

REFERENCE SIGNS LIST

101: sample
102: sample cup
103: sample disk
104: reagent
105: reagent bottle
106: reagent disk
107: reaction solution
108: reaction cell
109: reaction disk
110: sample dispensing mechanism
111: reagent dispensing mechanism
112: agitating unit
113: absorbance measurement unit
114: cleaning unit
115: constant temperature fluid
201: control circuit
202: light intensity measurement circuit
203: data processing unit
2031: information recording unit
2032: analysis unit
204: input unit
205: output unit
301: light source unit
302: spectroscope
3021: diffraction grating
3022: detector array
401: optical axis
402: light source side slit 403: condensing lens
404: spectrometer side slit
501: first LED
502: second LED
503: LED mounting substrate
504: temperature adjustment unit
505: temperature sensor
506: dichroic filter
507: reflector
508: diffusion plate

The invention claimed is:

1. An automatic analyzer for measuring a sample, comprising:
    a light source for irradiating a reaction vessel storing the sample with light, and
    a temperature adjustment mechanism for adjusting the temperature of the light source,
    wherein the light source includes a first LED and a second LED,
    wherein the light source is configured such that light emitted from the second LED is reflected on a reflective element to change an optical path, thereby the light emitted from the second LED is multiplexed with light emitted from the first LED on a same optical axis as that of light emitted from the first LED, and
    wherein the temperature adjustment mechanism is configured by a member that is in contact with the first LED and the second LED respectively,
    wherein a light intensity of the second LED is larger than a light intensity of the first LED,
    wherein the light source further includes:
    a first optical element that allows at least a part of first light emitted from the first LED to pass; and
    a second optical element that reflects second light emitted from the second LED,
    wherein the first optical element is configured to reflect at least a part of the second light,
    wherein the first optical element and the second optical element are arranged such that the first light having passed through the first optical element and the second light reflected by the first optical element are configured to be multiplexed on a same optical axis to become multiplexed light,
    wherein the first LED is a white LED that generates white light in a wavelength range of 350 nm to 800 nm, and
    wherein the second LED is an ultraviolet LED that generates ultraviolet light having a central wavelength of 350 nm or less.

2. The automatic analyzer according to claim 1, wherein the temperature adjustment mechanism is configured by:
    one LED mounting substrate for mounting the first LED and the second LED; and
    a temperature adjustment unit that adjusts a temperature of the LED mounting substrate to keep a temperature difference between the first LED and the second LED within a predetermined range.

3. The automatic analyzer according to claim 1, further comprising:
    a diffusion member for diffusing the second light.

4. The automatic analyzer according to claim 3,
    wherein the first light is diffused within a first diffusion range on a light receiving surface of a light receiver that receives the multiplexed light,
    wherein the second light is diffused within a second diffusion range on the light receiving surface, and
    wherein the diffusion member diffuses the second light such that the first diffusion range is included in the second diffusion range.

5. An automatic analyzer for measuring a sample, comprising:
    a light source for irradiating a reaction vessel storing the sample with light, and
    a temperature adjustment mechanism for adjusting the temperature of the light source,
    wherein the light source includes a first LED and a second LED,
    wherein the light source is configured such that light emitted from the second LED is reflected on a reflective element to change an optical path, thereby the light emitted from the second LED is multiplexed with light emitted from the first LED on a same optical axis as that of light emitted from the first LED,
    wherein the temperature adjustment mechanism is configured by a member that is in contact with the first LED and the second LED respectively,
    wherein a light intensity of the second LED is larger than a light intensity of the first LED,
    wherein the light source further includes:
    a first optical element that allows at least a part of first light emitted from the first LED to pass; and
    a second optical element that reflects second light emitted from the second LED,
    wherein the first optical element is configured to reflect at least a part of the second light,
    wherein the first optical element and the second optical element are arranged such that the first light having passed through the first optical element and the second light reflected by the first optical element are multiplexed on a same optical axis to become multiplexed light,
    wherein the automatic analyzer further includes a diffusion member for diffusing the second light, and
    wherein the diffusion member is configured by a diffusion plate that is arranged between the second LED and the second optical element and that diffuses the second light.

6. The automatic analyzer according to claim 5, wherein the diffusion member is formed on a reflection surface of the second optical element by processing the reflection surface of the second optical element so as to diffuse the second light.

7. The automatic analyzer according to claim 1,
    wherein a transmittance at which the first optical element allows the first light to pass is configured such that, on a wavelength spectrum of the multiplexed light:
    a first wavelength component has a first light intensity;
    a second wavelength component has a second light intensity; and
    a third wavelength component has a third light intensity, and
    wherein when on a wavelength spectrum of light emitted from a halogen lamp, the first wavelength component has a fourth light intensity, the second wavelength component has a fifth light intensity, and the third wavelength component has a sixth light intensity, the first optical element is configured such that:
    a difference between a first ratio of the second light intensity to the first light intensity and a second ratio of the fifth light intensity to the fourth light intensity is within an allowable range; and
    a difference between a third ratio of the third light intensity to the second light intensity and a fourth ratio of the sixth light intensity to the fifth light intensity is within the allowable range.

8. The automatic analyzer according to claim 1, further comprising:
a control unit for adjusting an intensity of light emitted by the light source by adjusting a drive current of the light source and a temperature of the temperature adjustment mechanism.

9. The automatic analyzer according to claim 8,
wherein the control unit acquires temperature changes over time in an environment in which the automatic analyzer is installed, and
wherein the control unit sets a target temperature of the temperature adjustment mechanism according to the temperature changes over time.

* * * * *